(12) United States Patent
Gupta et al.

(10) Patent No.: US 10,713,140 B2
(45) Date of Patent: Jul. 14, 2020

(54) IDENTIFYING LATENT STATES OF MACHINES BASED ON MACHINE LOGS

(71) Applicant: FAIR ISAAC CORPORATION, San Jose, CA (US)

(72) Inventors: Ashish Gupta, Bangalore (IN); Shafi Ur Rahman, Bangalore (IN); Sambandan Murugan, Chennai (IN)

(73) Assignee: FAIR ISAAC CORPORATION, San Jose, CA (US)

( * ) Notice: Subject to any disclaimer, the term of this patent is extended or adjusted under 35 U.S.C. 154(b) by 661 days.

(21) Appl. No.: 14/736,093

(22) Filed: Jun. 10, 2015

(65) Prior Publication Data

US 2016/0364464 A1 Dec. 15, 2016

(51) Int. Cl.
*G06F 11/30* (2006.01)
*G06F 11/32* (2006.01)

(52) U.S. Cl.
CPC .......... *G06F 11/30* (2013.01); *G06F 11/3055* (2013.01); *G06F 11/3075* (2013.01); *G06F 11/328* (2013.01)

(58) Field of Classification Search
CPC ................................ G06F 11/30; G06F 11/00
USPC ......................................................... 707/738
See application file for complete search history.

(56) References Cited

U.S. PATENT DOCUMENTS

| | | | |
|---|---|---|---|
| 5,465,321 A | 11/1995 | Smyth | |
| 6,868,325 B2 | 3/2005 | Menon et al. | |
| 7,302,451 B2 | 11/2007 | Radhakrishnan et al. | |
| 7,561,991 B2 | 7/2009 | Matsunaga et al. | |
| 7,930,746 B1 * | 4/2011 | Sheleheda | H04L 63/1425 713/151 |
| 8,155,820 B2 | 4/2012 | Eklund et al. | |
| 8,185,348 B2 | 5/2012 | Shan et al. | |
| 8,418,249 B1 | 4/2013 | Nucci et al. | |
| 8,635,174 B2 | 1/2014 | Kobayashi | |
| 8,751,414 B2 | 6/2014 | Datta et al. | |
| 8,775,358 B2 | 7/2014 | Bonawitz et al. | |
| 8,909,562 B2 | 12/2014 | Bhatnagar et al. | |
| 9,544,321 B2 | 1/2017 | Baikalov et al. | |
| 2003/0117279 A1 | 6/2003 | Ueno et al. | |
| 2004/0181527 A1 * | 9/2004 | Burdick | G06F 17/30598 |
| 2005/0111535 A1 * | 5/2005 | Saey | H04L 27/2608 375/222 |
| 2007/0288451 A1 * | 12/2007 | Meyer | G06F 16/313 |
| 2007/0294223 A1 * | 12/2007 | Gabrilovich | G06F 16/353 |
| 2008/0046430 A1 * | 2/2008 | Niekamp | G06K 9/6218 |

(Continued)

*Primary Examiner* — Jensen Hu
(74) *Attorney, Agent, or Firm* — Mintz, Levin, Cohn, Ferris Glovsky and Popeo, P.C.

(57) ABSTRACT

The state of a system is determined in which data sets are generated that include a plurality of data instances representing states of one or more components of a computer system. The data instances generated by one or more data set sources that are configured to output a data instance in response to a trigger associated with the one or more components. The data instances are normalized by the application of one or more rules. The data instances from individual data set sources are separately collated to generate groups of time-specific collated data instances. State types may be assigned to each of the collated data instance groups. Distributions of state-types across the groups may be determined and a list of infrequent state-types may be generated based on the determined distributions of state-types across the groups.

19 Claims, 5 Drawing Sheets

(56) References Cited

U.S. PATENT DOCUMENTS

| | | | |
|---|---|---|---|
| 2008/0154555 A1 | 6/2008 | Qu et al. | |
| 2010/0290601 A1* | 11/2010 | Chen | H04M 3/2218 |
| | | | 379/88.22 |
| 2011/0055122 A1 | 3/2011 | Andreoli | |
| 2012/0093424 A1* | 4/2012 | Denney | G06K 9/6265 |
| | | | 382/225 |
| 2012/0123981 A1 | 5/2012 | Graves et al. | |
| 2012/0191457 A1* | 7/2012 | Minnis | G10L 13/10 |
| | | | 704/260 |
| 2013/0080641 A1 | 3/2013 | Lui et al. | |
| 2013/0152158 A1* | 6/2013 | Yoshihama | G06F 21/60 |
| | | | 726/1 |
| 2013/0246606 A1* | 9/2013 | Branch | H04L 41/0853 |
| | | | 709/224 |
| 2013/0305093 A1 | 11/2013 | Jayachandran et al. | |
| 2014/0108314 A1 | 4/2014 | Chen et al. | |
| 2014/0164352 A1* | 6/2014 | Denninghoff | H03H 9/02622 |
| | | | 707/711 |
| 2014/0180980 A1 | 6/2014 | Hido et al. | |
| 2014/0215053 A1 | 7/2014 | Marwah et al. | |
| 2014/0310714 A1 | 10/2014 | Chan et al. | |
| 2015/0113649 A1 | 4/2015 | Angelov | |
| 2015/0262130 A1* | 9/2015 | Taylor | G06Q 10/1053 |
| | | | 705/321 |
| 2015/0304346 A1 | 10/2015 | Kim | |

\* cited by examiner

IDENTIFYING LATENT STATES OF MACHINES BASED ON MACHINE LOGS

TECHNICAL FIELD

The subject matter described herein relates to analyzing machine logs to determine likely future outcomes and component failure of systems.

BACKGROUND

An operational IT system produces traces of system's functioning primarily through machine generated plain text logs. These logs contain valuable information useful for system monitoring, debugging and improvement. Unfortunately, without extensive knowledge of working of system, making sense of these logs is an almost impossible task. Furthermore, the volume of logs is typically prohibitive for manual exploration of them.

Machine logs are generated by explicit instructions in source code of system components encoded by the developer in a piece of software governing the working of that component. Hence each log-line can be tracked to a PRINT or equivalent statement in underlying source code, which is a reflection of flow of control and order of execution of code. This information may be labeled as a system 'state'.

SUMMARY

In one aspect, a computer implemented method to determine the state of a system is provided. The computer implemented method may include receiving data sets that include a plurality of data instances. The plurality of data instances may represent states of one or more components of a computer system. The one or more components of a computer system may be hardware components, software components and/or other components. The data instances may be generated by one or more separate data set sources that are configured to output a data instance in response to a trigger associated with the one or more components. The data instances may have associated time information. The trigger can include a component reaching a particular internal state, an interaction with one or more other components, the occurrence of an event associated with the one or more components and/or other triggers.

The data instances may be normalized by applying one or more rules to the data instances. The rules applied to the data instances to normalize the data instances may include abstracting common parameters out of the data instances. Such common parameters may include parameters that do not contribute to an understanding of the internal state of the one or more components, an interaction with one or more other components, and/or other events associated with the data instances. Examples of common parameters can include an entity identifier, a date and timestamp, and other common parameters. The rules applied to the data instances to normalize the data instances may include abstracting special characters out of the data instances. Data instances themselves may help generate rules using our algorithm which may improve parameter abstraction process and make it context independent. One such rule, pertaining to text data instances, may relate to abstracting out rarely occurring words from all data instances. Rare words may be defined at various levels, for example, words with word-frequency contribution less than 1% of total.

The data instances of the data sets from individual data set sources may be collated across individual time elements to generate groups of time-element-specific collated data instances. Time elements may be any selected unit of time. For example, the time element may be minute, hour, day, week or other time periods.

In some variations, the data instances from individual data set sources may be grouped based on the similarity of the data instances. The similarity of data instances may be based on the size of the data instances. The groups may be fixed-size groups. In some implementations, the data instances may include log lines. Log lines may be grouped based on the length of the log lines. The log lines may be grouped into fixed-width groups. For example, log lines may be grouped into groups comprising widths of 0 to 100, 101 to 500, 501 to 1000, 1001 to 2000, or any other suitable width groups. The log lines may also, in some implementations, be grouped into fixed-frequency groups. For example, log lines may be grouped into bins comprising of 2% of total number of log lines.

Determining the similarity of the data instances may include determining a distance between each pair of data instances within each collated group of data instances. In some variations, determining a distance between each pair of data instances within each of the collated groups may include determining the a similarity distance metric between each pair of data instances within each of the collated groups.

In some variations determining the distance between each pair of data instances within each of the collated groups may include determining the number of times a word must be substituted, removed, or inserted to transform a first data instance into the second data instance of each pair of data instances. In some variations, twice as much weight may be applied for substitution of words than for insertion and removal of words. In some variations, determining the distance between each pair of data instances in each of the collated groups of data instances may include determining the proxy distance. Where data instances include log-lines, proxy distance may include a number of non-common words between log-lines.

In some variations the data instances may be clustered based on the similarity between pairs of data instances within each collated group. The number of clusters to use may be determined based on the maximization of an objective function equation. The number of clusters may be determined based on the average distance of a data instance within a cluster viz. a viz. the average distance of a given data instance with all data instances in nearest neighbor clusters. Definition of Silhouette Coefficient metric, thus computed, can be modified to include distance of data instance with itself. Overall objective function can be computed as combined effect of individually computed metric. A penalty function proportional to the number of clusters may be used as a control for the number of clusters. The penalty proportional to number of clusters may be assigned to limit total number of clusters created and avoid cluster fragmentation. User input in form of information about which data instances must belong to same cluster, and which must not, can optionally be used to refine clustering process. Heuristic based search procedure finds right number of cluster maximizing above described objective function.

Having clusters of similar data instances can result in individual clusters of data instances representing states of the computer system. A time sequence of individual clusters of data instances may represent the transition between states of a computer system over time.

State-types can be assigned to each of the groups of collated data instances and/or clusters. For data instances unseen by the model so far, state-types may be assigned by, first, representing each state/cluster by a reference or benchmark line, and then finding reference closest to unseen data instance. The distribution of state-types across the groups of data instances may be determined. From the sequence of groups and/or clusters a list of infrequent state-types may be generated based on the determined distributions of state-types across the groups. State types associated with, and possibly pre-occurring, the infrequent state-types may be determined allowing for predictions of when the occurrence of infrequent state-types which may typically represent system-wide errors or serious component errors.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, the present disclosure provides a method for abstracting voluminous amount of data representing states of various computer components and/or entire computer systems without the need for expert input or intervention, without need for separate underlying source code to be embedded or modified in the individual components, and/or without need for explicit documentation of the system.

By grouping and/or clustering the data instances representing the state(s) of system components and/or entire systems in the manner described may allow the data to be parsed more efficiently and allow for a greater impact from the same exerted effort. Similarly, appropriate passers may be discovered through the comparison of the sequences of data instance sequences. The presently disclosed method compresses the data information associated with the data instances without significant loss of information allowing for the computer systems to make these determinations more efficiently and using much less effort in the process. Additionally, grouping and/or collating the data instances in the manner described may allow determination of future system errors. Identifying trends in the data instance sequences yields the ability to foresee future events within a component and/or computer system. Identifying these infrequent errors within a voluminous amount of data instances will facilitate the determination of which component and/or system conditions result in major component and/or system errors. Once these conditions have been determined it will be possible to predict future major component and/or system errors and implement actions to avoid such major component and/or system errors.

The subject matter described herein provides many technical advantages. For example, the current subject matter provides an automated way of discovering system states across huge volumes of machine logs and across a plurality of different formats that machine logs are generated in. The current subject matter is also advantageous in that it automatically discovers hidden markers of states of the system without the need for human expertise, system documentation or specialized source code.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
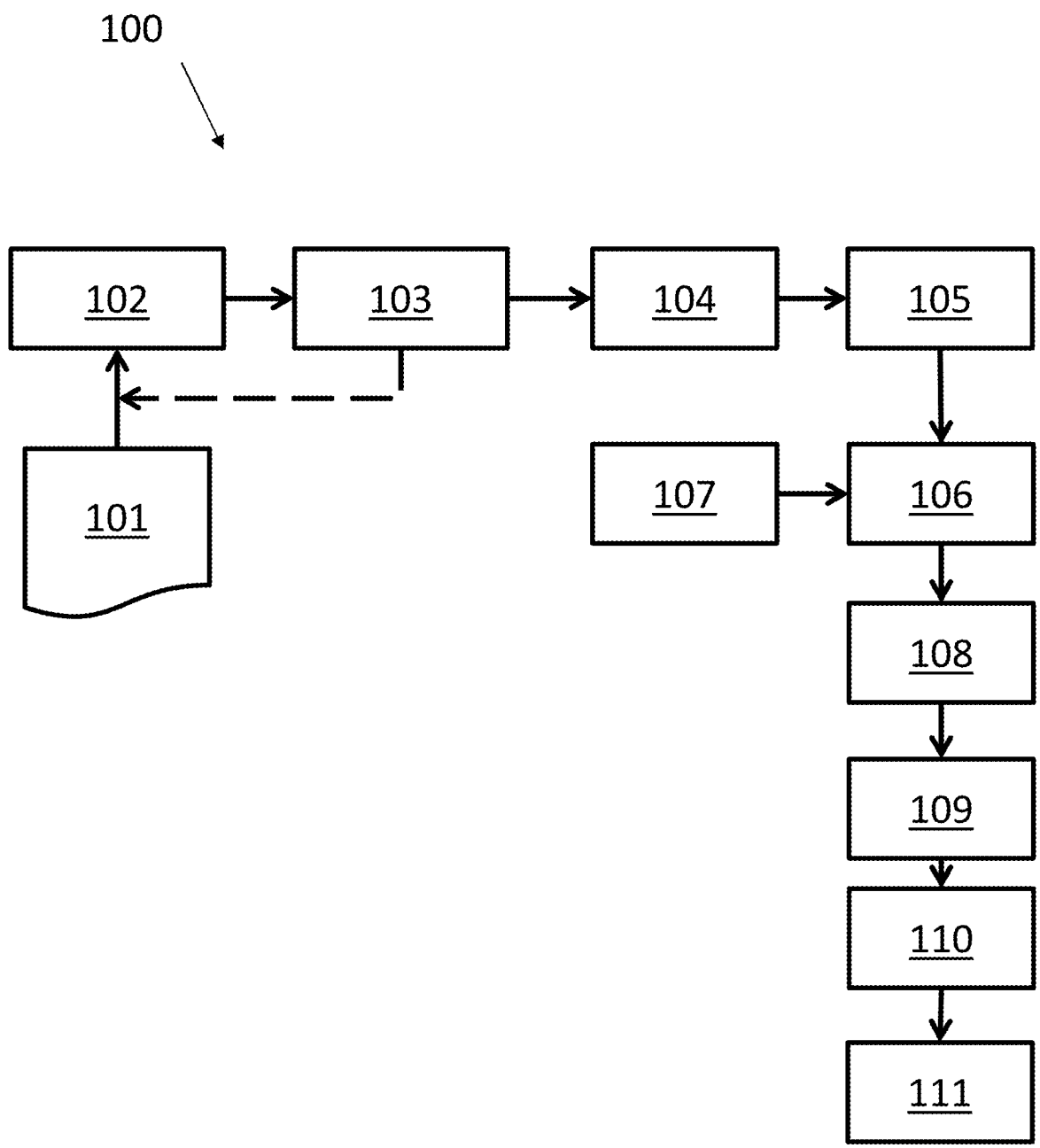
FIG. 1 is a process flow diagram illustrating aspects of a method having one or more features consistent with implementations of the current subject matter.

The present disclosure is directed toward analyzing log data and using the analysis of the log data to predict the future state of machines and/or computer systems. For example, analysis of the log data may yield a prediction as to how and when a machine and/or computer system, or component thereof, might fail.

A machine can be a complex system. Examples of a machine include a software application or an app, an operating system, a cluster of servers, a network, an electricity grid monitoring system such as SCADA, or any other machine. A log can include logs, messages, signals and/or other data construct. The logs can be structured, partially unstructured or fully unstructured. The present disclosure is directed to determining the latent state of a machine based on the unstructured or semi-structured logs, messages or signals generated by it. Its application includes predicting future state of the machine, including failure or anomalous state.

The present disclosure relates to machine-generated log data as well as sensor-generated data. Where disclosure is directed to either machine-generated log data or sensor-generated data, that disclosure is equally applicable to the other.

Log lines, or sensor data points, typically represent an underlying state of the component or the system to which they relate. In the context of the log data, a particular log line is generated when the control flow of the underlying program controlling a component or system reaches a particular state of execution which necessitates the generation of the log line. The log line might just be informing that everything is fine, or some action has been taken, or an exception has been reached. As such, individual log lines, or the individual sensor data points, are the observed states representing underlying unobserved states of the system or one or more of its components. There is a 1:1 correspondence between the observed and the unobserved states, thus allowing them to be virtually interchangeable.

The states of the system or its components, individually or collectively may be identified. The states may be identified by clustering together the log lines based on their edit distances. Edit distances between log lines is a way of quantifying how dissimilar two log lines are to one another. The edit distance of two log lines is equal to the number of operations required to transform one of the log lines into the other log line. One method of clustering together log lines based on their edit distances requires the generation of large distance matrix. Various methods of reducing the computational burden of generating such a large distance matrix are described herein, resulting in a computationally efficient way of clustering together log lines based on their edit distances A list of underlying states may be generated by the presently disclosed system. The list of underlying states may be determined from all possible underlying states of each component of a system. The list of underlying states may be determined based on the individual states of the system and/or its components represented by each log-line or sensor data point. Each of the log lines may be labeled with one or more of the underlying states to generate a sequence of state transitions where the log lines are clustered in time based order. The state transitions representing component state transitions and/or system state transitions.

FIG. 1 is a process flow diagram 100 illustrating aspects of a method having one or more features consistent with implementations of the current subject matter. At 101 data sets that include a plurality of data instances representing states of components of a computer system are received. The data instances may be generated by one or more separate data set sources that are configured to output a data instance in response to a trigger associated with the one or more components. The data instances may have associated time information. The associated time information may include a time at which the data instance was generated by the data set sources.

At 102 the received data sets may be normalized. The data sets may be normalized by passing the datasets through a series of filters. At 102 common parameters associated with the data sets may be parsed out of the data sets. Such common parameters may include, for example, timestamps, IP addresses associated with system components, the duration of any events associated with the components, and other common parameters. The common parameters may be parsed out through the use of multiple different operations. An example of one such set of operations is Regular Expression. Regular Expression-based find and replace may be used to remove common parameters that appear commonly throughout the data sets of data instances.

At 102 special characters and/or non-standard data may be parsed out of the data sets. In some implementations special characters and common parameters may be replaced in the data instance with place holder data. Such place holder data may preserve the size of the data instance while removing the information. In an example where the data instance is a log-line of a machine log, special characters and common parameters may be replaced with spaces. In instances where there are multiple consecutive placeholders in the data instance, the multiple consecutive placeholders may be trimmed into a single placeholder, thereby preserving the separation of information contained in each data instance. In some implementations, the placeholder data may be representative of the type of information parsed out of the data instance. For example, where a timestamp has been parsed out of the data instance a timestamp-type placeholder may be inserted, where an IP address has been parsed out of the data instance an IP address-type placeholder may be inserted. In some variations, a user of the presently disclosed system may augment such normalizing filters used at 102 to include custom filters.

At 102 multi-parameter data instances may be transformed into single-parameter data instances. In the example where the data instances are log-lines, multi-parameter data instances may be multi-line log-lines. In such an example, at 102, the multi-line log lines may be transformed into single-line log lines. Common data between the multiple parameters of a multi-parameter data instance may be removed. The remaining data of the multi-parameter data instance may be combined to create a single-parameter data instance containing items of information from each parameter.

Figure 2:
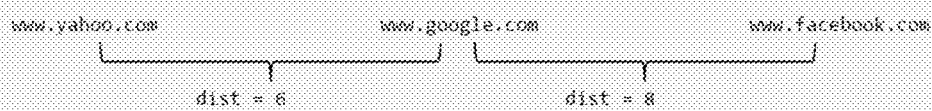
FIG. 2 is an illustration of an example of a data instance being normalized in accordance with one or more features consistent with implementations of the current subject matter.

FIG. 2 is an illustration of an example 200 of a data instance being normalized at 102.

At 103 a rare information list may be generated. The rare information list may be generated based on the frequency of various types of information appearing in the received data sets. In the example where the data sets are machine logs rare information may be in the form of rare words. In such an example, at 103, a rare word list may be generated based on the relative frequency that various words appear in the received data instances. At 103, the rare information list associated with the data sets may be abstracted through the filters utilized at 102.

At 104 the normalized data instances from each of the data set sources may be optionally assigned to groups based on the size of the data instances. In some implementations the groups may be groups of a predetermined size. The number of such groups and range of data instance sizes within each group may be determined based on fixed-width binning or fixed-frequency binning. Assigning the data instances from each data set source into groups based on size or volume has a number of advantages. One such advantage is that data instances having significantly different sizes are unlikely to be associated with the same state. Consequently, such data instances can be separated very efficiently based on assigning data instances to groups, rather than through complex algorithms. In the case where the data instances represent log lines, the log lines may be grouped based on the length of the log lines. Log lines of significantly different lengths are unlikely to represent the same state of a component or a computer system. Another advantage of grouping data instances in this manner is that the overall problem reduces into multiple smaller problems. Consequently, the computational effort required to solve the problem is reduced because the number of combinations of data instances in which to process reduces to a fraction of the original number.

In some implementations, the operations performed at 104 may be optional. In some instances, the operations performed at 104 may become redundant, especially where the operations performed at 106 are performed using parallel processing.

At 105 a modified similarity distance metric between pairs of normalized data instances from each data set source may be determined. In some instances, where the operations at 104 were optionally performed, the modified similarity distance metric between pairs of data instances within size groups may be determined. Data instances may be clustered based on the difference in size between each of the data instances. The clustering may be performed for each group formed at 104 individually. As previously stated, the distance between log-lines is the number of operations required to transform one log line into another.

Figure 3:
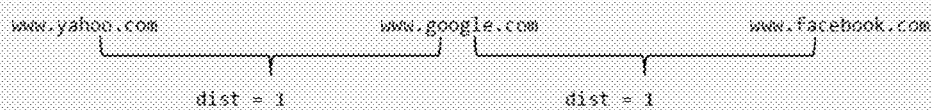
FIG. 3 is an illustration of an example of the difference between using characters and words as the basic unit of insertion, deletion and substitution when calculating the distance between two data instances in accordance with one or more features consistent with implementations of the current subject matter.

In some implementations, the difference in size between each data instance may be determined by a modified similarity distance metric. The similarity distance metric between two log lines is the minimum number of single-character edits (i.e. insertions, deletions, or substitutions) required to transform a first log line into a second log line. Two identical log lines will have a similarity distance metric of zero. A modified similarity distance metric may be determined by using space-separated words, rather than characters, as the basic unit of insertion, deletion and substitution to compute distance between two log lines. FIG. 3 is an illustration of an example 300 of the difference between using characters and words as the basic unit of insertion, deletion and substitution. One example of a similarity distance metric is the Levenshtein distance. Specifically, FIG. 3 shows an illustration of calculating the Levenshtein distance and the similarity distance metric between "www.google.com", "www.yahoo.com", and "www.facebook.com". The similarity distance metric can include a modified Levenshtein distance. Each of these is a URL and each of these URLs will take you to a different website. Consequently, for the purposes of determining the state of a component or a system, the difference between these URLs is the same. Calculating the character level similarity distance metric between these URLs will yield the result that "www.google.com" has greater similarity with "www.yahoo.com" than with "www.facebook.com". Calculating the modified similarity distance metric, where the basic unit for deletion, insertion and substitution is at the word level, yields the result that each of the URLs has the same similarity with each of the other URLs.

Figures 4, 5:
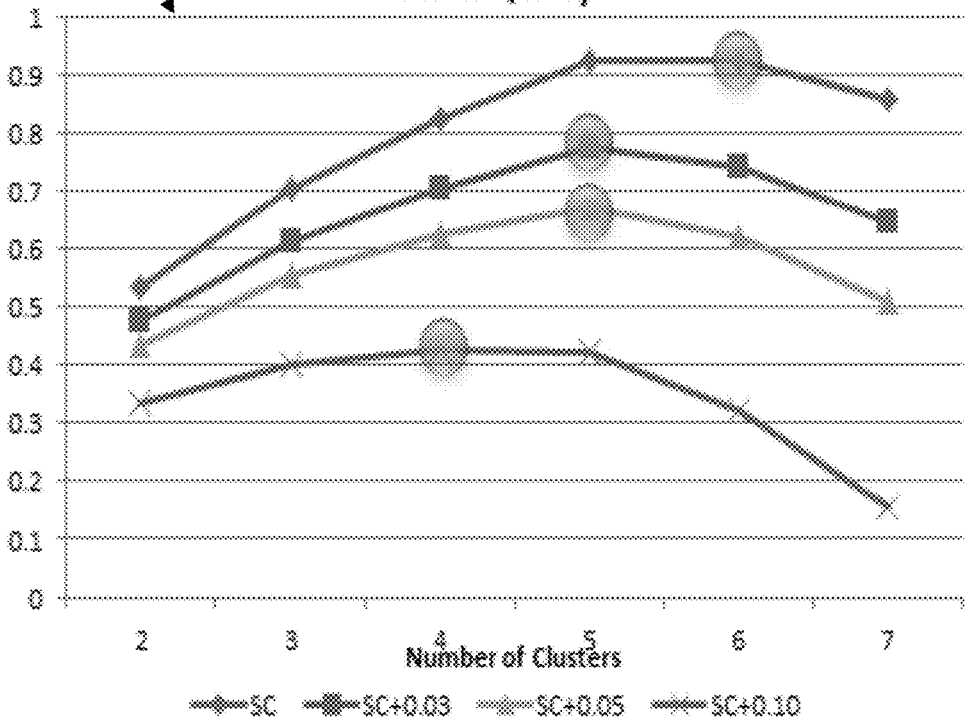
FIG. 4 illustrates a determination of a modified similarity distance metric between two strings in accordance with one or more features consistent with implementations of the current subject matter, where twice as much weight has been applied to substitutions than for insertions and deletions.
FIG. 5 illustrates a graph of an example of an objective function equation to show the quality of clusters as a function of the number of clusters.

The similarity distance metric may additionally apply twice as much weight to substitutions of words than for insertion and deletion of words. FIG. 4 illustrates an example 400 of the determination of a similarity distance metric between two strings, where twice as much weight has been applied to substitutions than for insertions and deletions. Specifically, FIG. 4 illustrates a determination of the similarity distance metric between three sentences: "jill comes down;" "jack goes up;" and, "jack goes up and comes down." Where there is no weighting applied, the similarity distance metric between the first sentence and the second sentence is the same as the similarity distance metric between the first sentence and the third sentence. Where twice the weighting is applied to substitutions rather than insertions or deletions, the similarity distance metric between the first and second sentences is twice that of the similarity distance metric between the first and third sentences. This aligns better with our understanding that second and third sentences are talking about similar subject one being extension of other, while first is conveying altogether different information and hence must be farther.

At 106 data instances having known similarity distance metric may be clustered using hierarchical clustering. In some implementations, agglomerative hierarchical clustering may be used. Each data instance may be initiated in its own cluster. Pairs of clusters may be merged as one moves up the hierarchy. In some implementations, divisive hierarchical clustering may be used. All observations may initiate in a single cluster. The cluster may split recursively as one moves down the hierarchy. In the case where the data instances are machine logs, the clustering process may require a distance matrix to be generated between all possible pairs of log lines.

Agglomerative hierarchical clustering may be chosen because it facilitates the creation of different numbers of tightly-bound clusters and is not prone to initial random seeding which is characteristic of divisive clustering.

At 107 input parameters to facilitate the hierarchical clustering may be determined. In some implementations the parameters determined at 107 include linkage type and the number of clusters. In some instances "complete" linkage, or minimum distance, is the most optimal clustering parameter. The number of clusters may be determined based on the maximization of an objective function equation. The objective function equation measures the combined effect of the quality of individual clusters and the total number of clusters.

The quality of a clustering outcome may be measured by any number of suitable methods. One such method may be using the Silhouette Coefficient. FIG. 5 illustrates a graph 500 of an example of an objective function equation to show the quality of clusters as a function of the number of clusters. The quality of clusters may be a function of cohesion within clusters, separation among the clusters, the number of clusters and/or other parameters. The Silhouette Coefficient has been determined for each of the individual clusters illustrated in FIG. 5.

Figure 7:
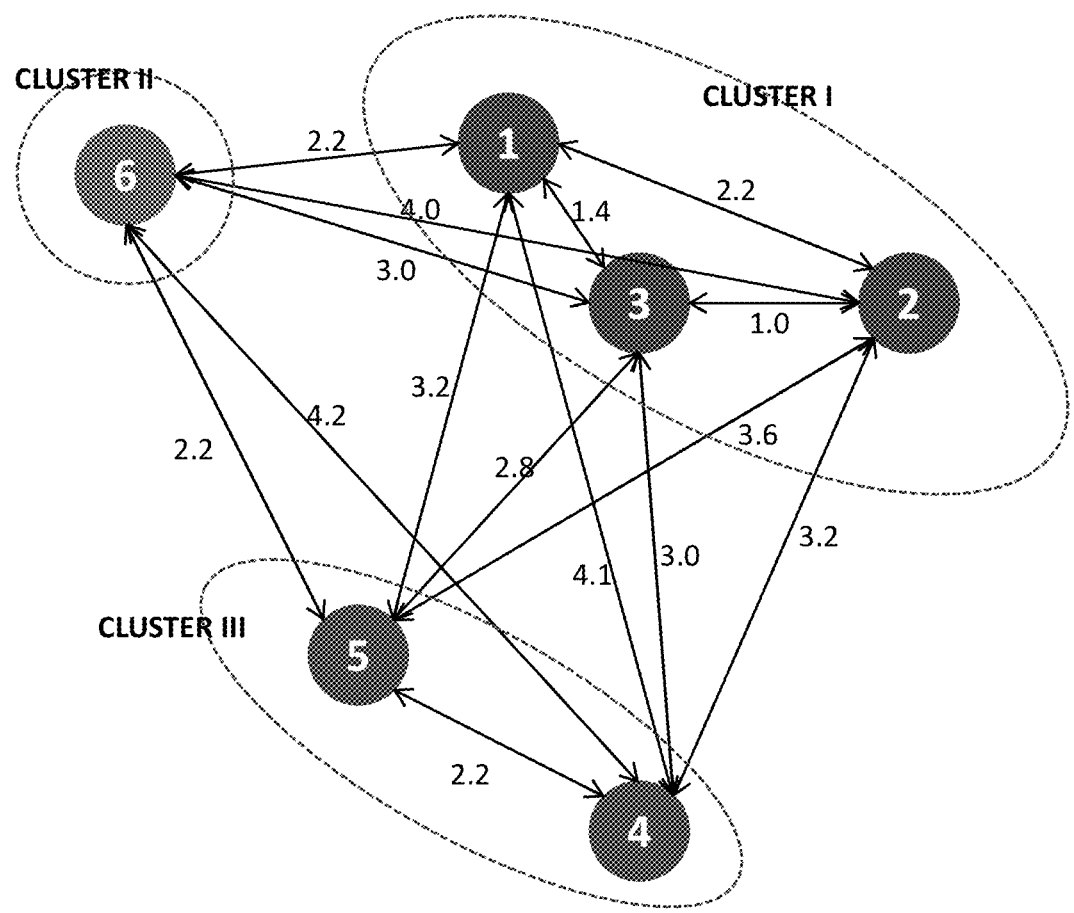
FIG. 7 is a diagram illustrating computation of a modified silhouette coefficient.

FIG. 7 is a diagram illustrating computation of a Silhouette Coefficient. The Silhouette Coefficient s for a single sample may be provided as:

$$s = \frac{b-a}{\max(a, b)},$$

where a is the mean distance between a sample and all other points in the same cluster, and b is the mean distance between a sample and all other points in the next nearest cluster.

The Silhouette Coefficient is a measure of how tightly grouped all of the data instances within any given cluster are. The Silhouette Coefficient for each of the data instances is based on the average distance of that data instance from all other data instances within the same cluster (not including itself), and the average distance of that point from all other points across nearest other clusters. The average Silhouette Coefficient over the entire dataset is a measure of how appropriately the data has been clustered. If there are too may, or too few, clusters then some of the clusters may typically display appreciably smaller Silhouette Coefficients than the rest. A plot of average Silhouette Coefficient (such as that in FIG. 7) may be used to determine the appropriate number of clusters.

Another such method of measuring the quality of the clustering outcome may be by using a modified Silhouette Coefficient. The modified Silhouette Coefficient for each data instance may also include the distance of that data instance from itself, i.e. 0 distance. This ensures that in an asymptotic scenario where each data instance falls into its own separate cluster, the Silhouette Coefficient is mathematically valid and is equal to 1.0, and the objective function is a smooth curve with change in number of clusters.

The mean of the Silhouette Coefficients for all individual data instances will increase monotonically with increasing number of data instances. A penalty parameter may be introduced that is proportional to a function of the number of cluster.

The objective function determined at 106 balances quality of individual clusters, quality of all clusters, and the number of clusters. Iterative heuristic search based computational processes using Hooke & Jeeve's algorithm for non-parametric search assist in deciding the optimal number of clusters. Each of the clusters comprises time-specific, state-specific clusters. Consequently, each of the clusters defines a new state for a component or the system.

Expert information in terms of which of the data instances must belong in the same cluster, and which must not, can be optionally utilized to further improve the clustering process and the cluster quality. This may be done but adjusting the pair-wise similarity matrix to to imply zero distance for pairs of data instances which must belong in the same cluster, and to imply very large distance, larger than maximum such distance in the similarity matrix, for pairs of data instances which must not belong in the same cluster.

At 108 clusters containing a small number of data instances may be combined. Where the data instances are machine log lines, clusters having only one or two log lines in them may be combined into a 'catch-all' cluster. This optional step reduces the number of states dramatically and avoids over weighting sampled data instances used for clustering.

At 109 state labels for each of the clusters created at 106, or 108 if optional step is undertaken, is determined. At 109, for each cluster, the distance of each data instance from every other data instance is obtained. In some implementations, the distance of each data instance from every other data instance will have been previously determined. In other instances, the distance of each data instance from every other data instance within a cluster must be determined. The data instance with the smallest distance from all other data instances is chosen as the labeling data instance (reference instance) for the cluster in which it resides. As such, individual clusters are given individual system or component state labels.

At 110 new and unseen data instances representing a states of the system and/or one or more components of the system are received. Similarity distance metrics computed between data instances, processed in the manner described with reference to FIG. 1, and all reference data instances. The new data instances are assigned to the cluster having the closest reference line. The distance computed at 110 may be determined based on proxy distances. Proxy distances include a number of non-common words. The modified similarity distance metric may be computed with the reference line of the cluster whose proxy distance is smallest, and compared with a pre-defined range of distances for that cluster. The cluster having a reference line closest to the new data instance may be assigned to that cluster.

If the comparison fails at 110 using the smallest proxy distance, the operation may be repeated using the second smallest proxy distance.

A number of non-common words may be used as a measure of proxy for the modified similarity distance metric, which uses a bag of words approach and ignores the order of the words. This improves process run-time by order of magnitude at small loss in accuracy.

At 111 the new system state determined by which cluster the new data instance(s) is/are assigned to is outputted. This output may be referred to as a so-called "hidden state" of the component and/or system.

Figure 6:
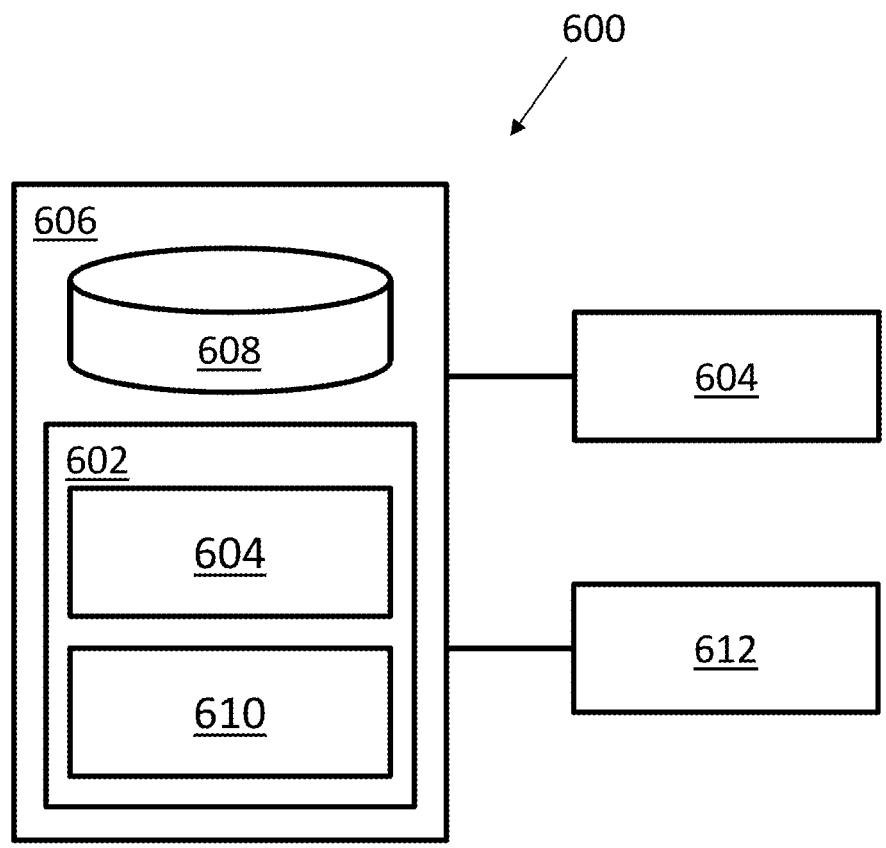
FIG. 6 is a diagram illustrating aspects of a system showing features consistent with implementations of the current subject matter.

FIG. 6 is a diagram illustrating aspects of a system 600 showing features consistent with implementations of the current subject matter. A system 600, such as a computer system, may include one or more system components 604. The one or more system components 604 may be hardware components, software components, or a combination of the two. The one or more system components 604 may have one or more states. The one or more states may change over time. The state(s) of the system components 604 may be recorded. The state(s) of the system components 604 may be recorded in accordance with a software program. The state(s) may be recorded as data instances to create sets of data instances associated with a system component 604. In some examples, the sets of data instances associated with the states of a system component may be machine logs. States of the system component may be recorded as individual log lines within the machine log. Machine logs may be generated by explicit instructions in source code, being a piece of software that is typically developed by a developer. The source code may be included in a system component 602 to control and/or monitor the system component 602. Alternatively, or in addition to, the source code may be included in another location in the system but may control and/or monitor the system component.

In some implementations, the system components 604 may be one or more sensors. The one or more sensors may be configured to obtain data representing one or more conditions external o the sensor(s). The data instances may be a representation of the observed data from the sensor(s).

Each data instance, or log-line, in a set of data instances, or machine log, may be tracked to an output command in the source code controlling and/or monitoring the associated system component. For example, many programming languages use a PRINT, or equivalent statement, to output information. In some examples, each of the data instances may be tracked to the PRINT, or equivalent, command in the source code controlling and/or monitoring the system component.

The state of the system component(s) 604 at any given time may be recorded in response to a trigger. The trigger may cause sets of data instances to be created and/or augmented with one or more data instances representing a state of the system component(s) 604. The trigger may be one or more system component(s) 604 correctly performing a number of operations in accordance with a software program controlling and/or monitoring the system component(s) 604. The trigger may be one or more system component(s) 604 failing to perform an operation in accordance with a software program controlling and/or monitoring the system component(s) 604. A system component may fail to perform an operation by failing to perform the operation at all, failing to perform the operation in an intended sequence, failing to perform the operation within a given period of time. The trigger may be the passage of a period of time. The source code controlling and/or monitoring the one or more system components 604 may be configured to cause create sets of data instances and/or augment sets of data with data instances representing the state of one or more system components 604 at predetermined intervals. The trigger may be a change of state of one or more of the system components. The trigger may be a combination of the passage of time and/or a change of state of one or more of the system components 604.

The system 600 may comprise one or more electronic storage devices 608. The one or more electronic storage devices 608 may store the sets of data instances, or machine logs. The source code associated with the controlling and/or monitoring the one or more system components 604 may be configured to cause data instances associated with the states of the component(s) 604 to be recorded to the electronic storage devices 608. The electronic storage devices 608 may be located in a computer system 606 or may be located remote from the computer system 606. The presently disclosed method may be performed on one or more computer processors 602. The one or more computer processors 602 may be the computer processor(s) 602 that execute the instructions contained in the source code controlling and/or monitoring the system component(s) 604. The computer processor(s) 602 may be separate from the system component(s) 604. The presently disclosed method may be executed by the a computer processor(s) 602 in response to the computer processor(s) performing actions as required by one or more computer program components 610.

In some implementations, the computer program configured to cause the processor(s) 602 to perform the method described herein may cause the generation of an output. The output may be generated on one or more components 612 of the system. The output may be generated on a component 612 that is integrated within the system being monitored, or may be external to the system being monitored.

The present disclosure provides a number of advantages. The present disclosure provides a method for abstracting voluminous amount of data representing states of various computer components and/or entire computer systems. This voluminous amount of data may be grouped into similar data instance types without the need for expert input or intervention. This may also be accomplished without the need for underlying source code embedded in the individual components. Thus presently disclosed generalized method may be performed on any system that includes data sets of data instances representing states of components within a computer system.

Each data instance may be associated with a state for a component and/or system. Each data instance may be identified with a state. Consequently, a sequence of data instances may be considered as a transition of states. Multiple sequences of data instances may be compared with each other. Seemingly separate data instance sequences may be determined to actually represent the same underlying system state. Knowing which sequences of data instances represent which underlying state may facilitate detecting anomalies, intrusions, security threats, operational inefficiencies, hidden brewing problems, unusual patterns in data sets of data instances, and/or other trends.

Data parsing turns unstructured data into structured tabular data. Having structured data allows for the visualizations of the data to be generated and for analysis to be performed on the data. By clustering the data instances representing state of system components and/or entire systems, parsing of the data may be made more efficient, and a greater impact may be achieved from the same exerted effort.

Comparing data instances may facilitate the discovery of appropriate parsers to use. In the example where the data instances are machine log-lines, text comparison algorithms may be used to discover parsers by comparing log-lines within each cluster.

Identifying states for individual data instances in the manner described herein compresses the data information associated with the data instances without significant loss of information. Consequently, the visualization of data instances may be made easier for reporting or debugging of the component(s) and/or system.

Structuring the data instances in the manner described herein, for example, by way of parsers or transition of states, makes the data instances more suitable for use with a variety of outlier detection and prediction models.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for implementation by one or more data processors forming part of at least one computing device, the method comprising:
    receiving data sets that include a plurality of data instances representing states of one or more components of a computer system, the data instances being generated by one or more separate data set sources that are configured to output a data instance in response to a trigger associated with the one or more components and having associated time information, the data instances comprising text;
    generating a list of rare words based on a relative frequency of the rare words in the received data sets;
    normalizing the data instances of the data sets by applying one or more rules to the data instances, wherein the one or more rules applied to the data instances to normalize the data instances includes abstracting the rare words on the list of rare words out of the data instances;
    separately collating the data instances of the data sets from individual data set sources across individual time elements to generate groups of time-element-specific collated data instances based only on the size of the data instances;
    assigning state-types to one or more of the data instance groups;
    determining distributions of state-types across the groups of data instances;
    generating a list of infrequent state-types based on the determined distributions of state-types across the groups;
    detecting and alerting about an unusual pattern in the data sets; and
    grouping data instances from individual data set sources based on a similarity distance between a first data instance and a second data instance, the similarity distance corresponding to a weighted sum of numbers of space-separated word insertions, space-separated word deletions, or space-separated word substitutions to transform the first data instance into the second data instance.

2. The computer-implemented method of claim 1, wherein the data instances from individual data set sources are grouped based on the similarity of the data instances.

3. The computer-implemented method of claim 2, wherein the data instances are assigned into fixed-size groups.

4. The computer-implemented method of claim 1, wherein the one or more rules applied to the data instances to normalize the data instances includes abstracting common parameters out of the data instances.

5. The computer-implemented method of claim 1, wherein the one or more rules applied to the data instances to normalize the data instances includes abstracting special characters out of the data instances.

6. The computer-implemented method of clam 2, wherein determining the similarity of the data instances includes determining the similarity distance between a first data instance and a second data instance within a collated group of data instances.

7. The computer-implemented method of claim 1, wherein the similarity distance comprises a Levenshtein distance.

8. The computer-implemented method of claim 1, wherein twice as much weight is applied for substitution of space-separated words than for insertion and removal of space-separated words.

9. The computer-implemented method of claim 1, wherein the similarity distance comprises the distance based on a set of proxy data instances.

10. The computer-implemented method of claim 1, wherein the data sets include machine logs and the data instances include machine-log-lines.

11. The computer-implemented method of claim 9, wherein the data instances include log-lines and the proxy data instances include a set of non-common words.

12. The computer-implemented method of claim 2, further comprising clustering the data instances based on the similarity distance between a first data instance and a second data instance within a collated group of data instances.

13. The computer-implemented method of claim 12, where the number of clusters is determined based on the maximization of an objective function equation.

14. The computer-implemented method of claim 12, where the number of clusters is determined based on the average similarity distance of a data instance within a cluster with all other data instances within that cluster and the average similarity distance of the data instance with all data instances in nearest neighbor clusters.

15. The computer-implemented method of claim 12 where a penalty function proportional to the number of clusters may be used as a control for number of clusters.

16. The computer-implemented method of claim 12, where individual clusters of data instances represent states of the computer system.

17. The computer-implemented method of claim 12, where a time sequence of individual clusters of data instances represent the transition of states of the computer system over time.

18. A system comprising:
at least one data processor; and
memory storing instructions which, when executed by the at least one data processor, result in operations comprising:
receiving data sets that include a plurality of data instances representing states of one or more components of a computer system, the data instances being generated by one or more separate data set sources that are configured to output a data instance in response to a trigger associated with the one or more components and having associated time information, the data instances comprising text;
generating a list of rare words based on a relative frequency of the rare words in the received data sets;
normalizing the data instances of the data sets by applying one or more rules to the data instances, wherein the one or more rules applied to the data instances to normalize the data instances includes abstracting the rare words on the list of rare words out of the data instances;
separately collating the data instances of the data sets from individual data set sources across individual time elements to generate groups of time-element-specific collated data instances based only on the size of the data instances;
assigning state-types to one or more of the collated data instance groups;
determining distributions of state-types across the groups of collated data instances;
generating a list of infrequent state-types based on the determined distributions of state-types across the groups;
detecting and alerting about an unusual pattern in the data sets; and
grouping data instances from individual data set sources based on a similarity distance between a first data instance and a second data instance, the similarity distance corresponding to a weighted sum of numbers of space-separated word insertions, space-separated word deletions, or space-separated word substitutions to transform the first data instance into the second data instance.

19. A computer-implemented method for implementation by one or more data processors forming part of at least one computing device, the method comprising:
receiving machine logs that include a plurality of log lines representing physical states of one or more components of a computer system, the log lines containing information about the physical state of the one or more components of the computer system and being generated by one or more separate machine log sources that are configured to output a log line in response to a trigger associated with the one or more components and to provide associated time information in the log line, the log lines comprising text;
normalizing the log lines of the machine logs by applying one or more rules to the log lines;
generating a list of rare words based on a relative frequency of the rare words in the received machine logs;
normalizing the log lines of the machine logs by applying one or more rules to the log lines, wherein the one or more rules applied to the log lines to normalize the log lines includes abstracting the rare words on the list of rare words out of the log lines;
separately collating the log lines of the machine logs from individual machine log sources across individual time elements to generate groups of time-element-specific collated log lines based only on the size of the log lines;
assigning state-types to one or more of the log-line groups based on the states represented by the log lines in one or more of the groups, the state-types of one or more group representing a state of the system;
determining distributions of state-types across the groups of log-lines;
generating a list of infrequent state-types based on the determined distributions of state-types across the groups; and
detecting and alerting about an unusual pattern in the data sets; and
grouping data instances from individual data set sources based on a similarity distance between a first data instance and a second data instance, the similarity distance corresponding to a weighted sum of numbers of space-separated word insertions, space-separated word deletions, or space-separated word substitutions to transform the first data instance into the second data instance.

* * * * *